US012651172B2

(12) United States Patent
Teng et al.

(10) Patent No.: US 12,651,172 B2
(45) Date of Patent: Jun. 9, 2026

(54) STATIC SCHEDULING AND DYNAMIC SCHEDULING FOR COMPILER-HINTED AND SELF-SCHEDULING MULTI-ENGINE ARTIFICIAL INTELLIGENCE (AI) PROCESSING UNIT SYSTEM

(71) Applicant: MEDIATEK INC., Hsinchu (TW)

(72) Inventors: Chieh-Fang Teng, Hsinchu (TW); En-Jui Chang, Hsinchu (TW); Chih Chung Cheng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 581 days.

(21) Appl. No.: 18/323,908

(22) Filed: May 25, 2023

(65) Prior Publication Data

US 2024/0177019 A1    May 30, 2024

Related U.S. Application Data

(60) Provisional application No. 63/385,215, filed on Nov. 29, 2022.

(51) Int. Cl.
G06N 3/063 (2023.01)
G06N 3/10 (2006.01)

(52) U.S. Cl.
CPC ............... G06N 3/10 (2013.01); G06N 3/063 (2013.01)

(58) Field of Classification Search
CPC .......... G06N 3/10; G06N 3/063; G06N 3/045; G06N 3/082; G06N 3/08; G06N 3/044;
(Continued)

(56) References Cited

U.S. PATENT DOCUMENTS

| | | | | |
|---|---|---|---|---|
| 11,593,628 | B2 * | 2/2023 | Febbo | G06N 3/0464 |
| 11,599,777 | B2 * | 3/2023 | Ben-Avi | G06N 3/063 |

(Continued)

FOREIGN PATENT DOCUMENTS

| | | | | |
|---|---|---|---|---|
| CA | 3069779 C | * | 6/2021 | G06N 3/063 |
| CN | 104375899 B | * | 3/2016 | |

(Continued)

OTHER PUBLICATIONS

Chinese language office action dated Dec. 9, 2024, issued in application No. TW 112146320.
(Continued)

*Primary Examiner* — Steven P Sax
(74) *Attorney, Agent, or Firm* — McClure, Qualey & Rodack, LLP

(57) ABSTRACT

Aspects of the present disclosure provide an apparatus. For example, the apparatus can include a compiler configured to compile a neural network (NN) model to generate a plurality of operations/threads and determine whether each of the operations/threads is compute bound or memory bound, and a memory coupled to the compiler and configured to store the operations/threads. The apparatus can also include a thread scheduler coupled to the memory and configured to schedule the operations/threads of the NN model. The apparatus can also include a multi-engine processing unit that includes a plurality of compute units (CUs), and an executor coupled between the thread scheduler and the multi-engine processing unit. The executor can be configured to allocate the operations/threads of the NN model and activate a number of the CUs of the multi-engine processing unit for each of the operations/threads based on whether the operation/thread is compute bound or memory bound.

18 Claims, 11 Drawing Sheets

(58) Field of Classification Search

CPC ........ G06N 3/084; G06N 3/09; G06N 3/0464; G06F 9/3001; G06F 9/5052; G06F 9/466; G06F 9/3877; G06F 9/30043; G06F 9/505; G06F 8/433; H04L 43/0876; G01N 33/5306

See application file for complete search history.

(56) References Cited

U.S. PATENT DOCUMENTS

| | | | | |
|---|---|---|---|---|
| 11,829,440 | B2 * | 11/2023 | Narayanamoorthy | G06F 9/30043 |
| 12,079,734 | B1 * | 9/2024 | Zheng | G06N 3/08 |
| 12,400,106 | B1 * | 8/2025 | Diamant | G06N 3/045 |
| 2014/0089699 | A1 * | 3/2014 | O'Connor | G09G 5/363 |
| | | | | 713/300 |
| 2016/0379109 | A1 * | 12/2016 | Chung | G06N 3/063 |
| | | | | 706/26 |
| 2017/0205863 | A1 | 7/2017 | Lee | |
| 2018/0046900 | A1 * | 2/2018 | Dally | G06F 9/3001 |
| 2019/0065281 | A1 * | 2/2019 | Bernat | H04L 43/0876 |
| 2021/0042610 | A1 * | 2/2021 | Chang | G06N 3/045 |
| 2021/0191770 | A1 * | 6/2021 | Rao | G06F 9/3877 |
| 2021/0271960 | A1 * | 9/2021 | Raha | G06F 9/3001 |
| 2021/0279557 | A1 | 9/2021 | Febbo | |
| 2022/0035679 | A1 * | 2/2022 | Sunwoo | G06N 3/09 |
| 2022/0036163 | A1 | 2/2022 | Kuo | |
| 2022/0206850 | A1 * | 6/2022 | Paul | G06F 9/505 |
| 2022/0244984 | A1 * | 8/2022 | Lee | G06F 9/466 |
| 2023/0409387 | A1 * | 12/2023 | Gupta | G06N 3/092 |

FOREIGN PATENT DOCUMENTS

| | | | | |
|---|---|---|---|---|
| CN | 118114729 A | * | 5/2024 | G06F 9/5027 |
| EP | 3396533 B1 | * | 3/2022 | G06N 3/045 |
| EP | 4208786 B9 | * | 9/2025 | G06F 8/433 |
| TW | 202121169 A | | 6/2021 | |
| WO | WO-2021030376 A1 | * | 2/2021 | G06N 3/0464 |

OTHER PUBLICATIONS

Chien-Hung Lin et al. ; A 3.4-to-13.3TOPS/W 3.6TOPS Dual-Core Deep-Learning Accelerator for Versatile AI Applications in 7nm 5G Smartphone SoC ; IEEE International Solid-State Circuits Conference ; 2020 ; 3 Pages.

Samuel Williams et al. ; Roofline: An Insightful Visual Performance Model for Multicore Architectures ; Communication of the ACM, vol. 52, No. 4 ; Apr. 2009 ; 12 Pages.

Extended European Search Report dated Mar. 19, 2024, issued in application No. EP 23211692.1.

* cited by examiner

| layer | bottleneck | # of active CUs | execution time |
|---|---|---|---|
| ResizeBilinear | compute bound | 4 | 10 |
| Conv2d | compute bound | 3 | 5 |
| DepthToSpace | memory bound | 1 | 20 |
| Add | memory bound | 2 | 15 |

STATIC SCHEDULING AND DYNAMIC SCHEDULING FOR COMPILER-HINTED AND SELF-SCHEDULING MULTI-ENGINE ARTIFICIAL INTELLIGENCE (AI) PROCESSING UNIT SYSTEM

CROSS-REFERENCE TO RELATED APPLICATIONS

This present application claims the benefit of U.S. Provisional Application No. 63/385,215, "Static Scheduling and Dynamic Scheduling for Compiler-hinted and Self-scheduling Multi-engine AI Processing Unit System" filed on Nov. 29, 2022, which is incorporated herein by reference in its entirety.

TECHNICAL FIELD

The present disclosure relates to neural networks (NNs), and, more particularly, to static scheduling and dynamic scheduling for compiler-hinted and self-scheduling multi-engine artificial intelligence (AI) processing unit system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A neural network (NN) model can be compiled to generate a plurality of operations/threads, which can be allocated and execute by a processing unit that includes a plurality of compute units.

SUMMARY

Aspects of the present disclosure provide an apparatus. For example, the apparatus can include a compiler configured to compile a neural network (NN) model to generate a plurality of operations/threads and determine whether each of the operations/threads is compute bound or memory bound. The apparatus can also include a memory coupled to the compiler. The memory can be configured to store the operations/threads of the NN model. The apparatus can also include a thread scheduler coupled to the memory. The thread scheduler can be configured to schedule the operations/threads of the NN model. The apparatus can also include a multi-engine processing unit that includes a plurality of compute units (CUs). The apparatus can also include an executor coupled between the thread scheduler and the multi-engine processing unit. The executor can be configured to allocate the operations/threads of the NN model and activate a number of the CUs of the multi-engine processing unit for each of the operations/threads based on whether the operation/thread is compute bound or memory bound.

In an embodiment, the apparatus can further include a performance monitor coupled to the executor. The performance monitor can be configured to monitor runtime performance of the multi-engine processing unit and/or runtime performance of a network coupled to the multi-engine processing unit, and the executor can be further configured to change the number of the CUs that are activated based on the runtime performance of the multi-engine processing unit and/or the runtime performance of the network. For example, the executor can be configured to change the number of the CUs that are activated by activating one of the CUS that are not activated or deactivating one of the CUs that are activated at a time. In an embodiment, the runtime performance of the multi-engine processing unit can include throughput of the CUS. In another embodiment, the runtime performance of the network can include input/output bandwidth between the network and the multi-engine processing unit.

In an embodiment, the multi-engine processing unit can further include a buffer that is coupled to and shared by at least two of the CUs. In another embodiment, the thread scheduler can be configured to schedule the operation/threads by maximizing uRate of the multi-engine processing unit while meeting thread execution constraints. The uRate can be (the number of active CUs×execution time)/(the number of CUs of the APU×the total execution time).

In an embodiment, the compiler can determine that one of the operations/threads is the compute bound if a compute cycle of the operation/thread is greater than a memory read/write (R/W) cycle of the operation/thread or is the memory bound if the compute cycle is not greater than the memory R/W cycle. In another embodiment, the memory can include a queue.

Aspects of the present disclosure provide another apparatus. For example, the another apparatus can include a compiler configured to compile a neural network (NN) model to generate a plurality of operations/threads. The another apparatus can further include a memory coupled to the compiler. The memory can be configured to store the operations/threads of the NN model. The another apparatus can further include a thread scheduler coupled to the memory. The thread scheduler can be configured to schedule the operations/threads of the NN model. The another apparatus can further include a multi-engine processing unit that includes a plurality of compute units (CUs). The another apparatus can further include a performance monitor configured to monitor runtime performance of the multi-engine processing unit and/or runtime performance of a network coupled to the multi-engine processing unit. The another apparatus can further include an executor coupled between the thread scheduler, the multi-engine processing unit and the performance monitor. The executor can be configured to allocate the operations/threads of the NN model, activate a number of the CUs of the multi-engine processing unit for each of the operations/threads, and change the number of the CUs that are activated based on the runtime performance of the multi-engine processing unit and/or the runtime performance of the network.

In an embodiment, the compiler can be further configured to determine whether each of the operations/threads is compute bound or memory bound, and the executor can be configured to activate the number of the CUs of the multi-engine processing unit for each of the operations/threads based on whether the operation/thread is compute bound or memory bound.

Aspects of the present disclosure also provide a multi-engine processing unit. For example, the multi-engine processing unit can include a plurality of compute units (CUs), and one or more buffers, at least one of which is coupled to and shared by at least two of the CUS.

In an embodiment, the one or more buffers can include one buffer that is coupled to and shared by all of the CUS.

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Neural networks (NNs), e.g., deep neural networks (DNNs) and convolutional neural networks (CNN), have been widely used in a variety of cognitive applications, e.g., pattern recognition, image classification, computer vision, natural language processing (NLP), etc., and have achieved remarkable successes in some scenarios where the volume of data that are to be processed far exceeds the capability of human beings, e.g., self-driven cars. The scale of the DNNs is becoming larger and larger, in order to better infer data that are input to the DNNs. Current DNN models may consist of hundreds of layers and millions of parameters, e.g., weights, biases, kernels and activation functions, and involve complex vector and matrix computations at each layer. For example, VGG-19 has as many as 39 giga floating point operations per second (GFLOPs) and 143 million parameters. However, too large a DNN model may be too complex to be efficiently run on general hardware platforms.

Central processing units (CPUs) can be used to perform complicated tasks with fewer threads, and thus depend on pre-defined rules to make decision about which thread to run at each clock. Graphic processing units (GPUs) can be used to perform simple tasks with many threads, and thus depend on hardware to schedule runnable threads for running instructions. Network-on-chips (NoC), e.g., in the form of mesh, tree and ring, have been widely utilized in modern multi-engine systems, e.g., deep learning accelerators (DLAs) such as accelerated (or artificial intelligence (AI)) processing units (APUs), for on-chip data transferring, and have provided a flexible, scalable and reusable solution to accelerate the operations of the DNN models.

Figure 1:
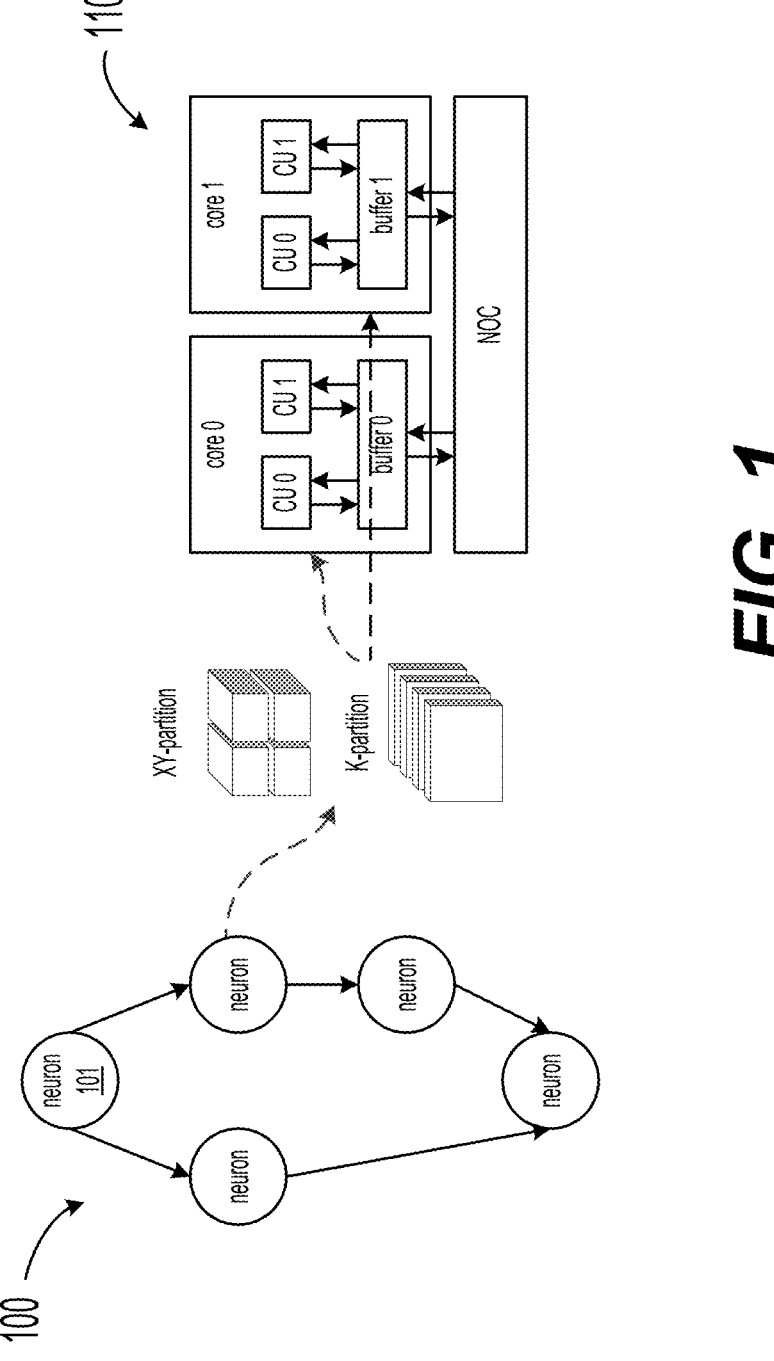
FIG. 1 is a schematic diagram showing a neural network (NN) model that can be mapped or allocated to a multi-engine artificial intelligence (AI) processing unit (APU) system.

FIG. 1 is a schematic diagram showing an NN model 100, e.g., a DNN model such as a CNN model, which can be mapped or allocated to a multi-engine APU system 110. The DNN model 100 may consist of a plurality of neurons 101 that are arranged in multiple layers. Tensor data input to the layers can be partitioned into blocks of filters and channels, called tiles, e.g., XY-partition tiles and K-partition tiles. Each of the partitioned tiles may require iterative use of the available compute units, e.g., a spatial reuse case and a spatiotemporal reuse case. The APU system 110 can include a plurality of processing cores, e.g., processing cores 0 and 1, each of which can include a plurality of compute units (CUs), e.g., CUs 0 and 1, that can compute the partitioned tiles allocated thereto in parallel to increase throughput.

When designing and evaluating a DNN model, e.g., the DNN model 100, designers should consider some key metrics, e.g., accuracy, throughput, latency, etc. Accuracy is used to indicate the quality of the result for a given task. Accuracy may be affected by the difficulty of the task and dataset. For example, object detection is more difficult than classification, and classification on ImageNet is much more difficult than on MNIST. Throughput is used to indicate the amount of data that can be processed or the number of executions of a task that can be completed in a given time period, e.g., reported as the number of operations or inferences per second. Latency measures the time between when input data arrives to a system and when a corresponding result is generated, e.g., reported in seconds.

Throughput, e.g., inferences per second, can be affected by $$\frac{\text{inferences}}{\text{second}} = \frac{\text{operations}}{\text{second}} \times \frac{1}{\frac{\text{operations}}{\text{inference}}}, \tag{1}$$

where the number of operations per second is dictated by both the DNN model, e.g., the DNN model 100, and the corresponding DNN hardware, e.g., the APU system 110, and the number of operations per inference is dictated by the DNN model 100.

As the APU system 110 includes a plurality of processing cores 0 and 1 and each of the processing cores 0 and 1 includes a plurality of CUs 0 and 1 that can compute the partitioned tiles allocated thereto in parallel, the operations per second can thus be affected by $$\frac{operations}{second} = \left(\frac{1}{\frac{cycles}{operation}} \times \frac{cycles}{second}\right) \times number\ of\ CUs \times utilization\ of\ CUs, \quad (2)$$

where the first term indicates the peak throughput of a single CU, e.g., the CU 0 or 1 of the processing core 0 or 1, the second term indicates the amount of parallelism, and the third term indicates degradation due to the inability of the architecture to effectively utilize the CUS 0 and 1. The first term can be increased by increasing the number of cycles per second, e.g., by a higher clock frequency and/or a shorter critical path. The second term can be increased by increasing the number of CUs and thus the maximum number of multiply-accumulate (MAC) operations that can be performed in parallel. The first term together with the second term only indicate the theoretical maximum throughput when all the CUs are performing the MAC operations.

The real achievable throughput further depends on the utilization of these CUs, i.e., utilization of CUs in equation (2), which can be affected by $$utilization\ of\ CUs = \frac{number\ of\ active\ CUs}{number\ of\ CUs} \times utilization\ of\ active\ CUs, \quad (3)$$

where the first term indicates the ability to distribute the workload to CUs, which may be determined by the flexibility of the APU system 110., and the second term indicates how efficiently these active CUs are processing the workload. Specifically, utilization of active CUs can be dictated by the timely delivery of workload to the CUS such that the CUs do not become idle while waiting for the data to arrive. For example, utilization of active CUs can be affected by the bandwidth and latency of the memory (including on-chip memory, e.g., tightly coupled memory (TCM), and off-chip memory, e.g., dynamic random access memory (DRAM)) and network. The bandwidth can be affected by the amount of data reuse available in the DNN model 100 and the amount of data reuse that can be exploited by the memory hierarchy and dataflow.

Figure 2:
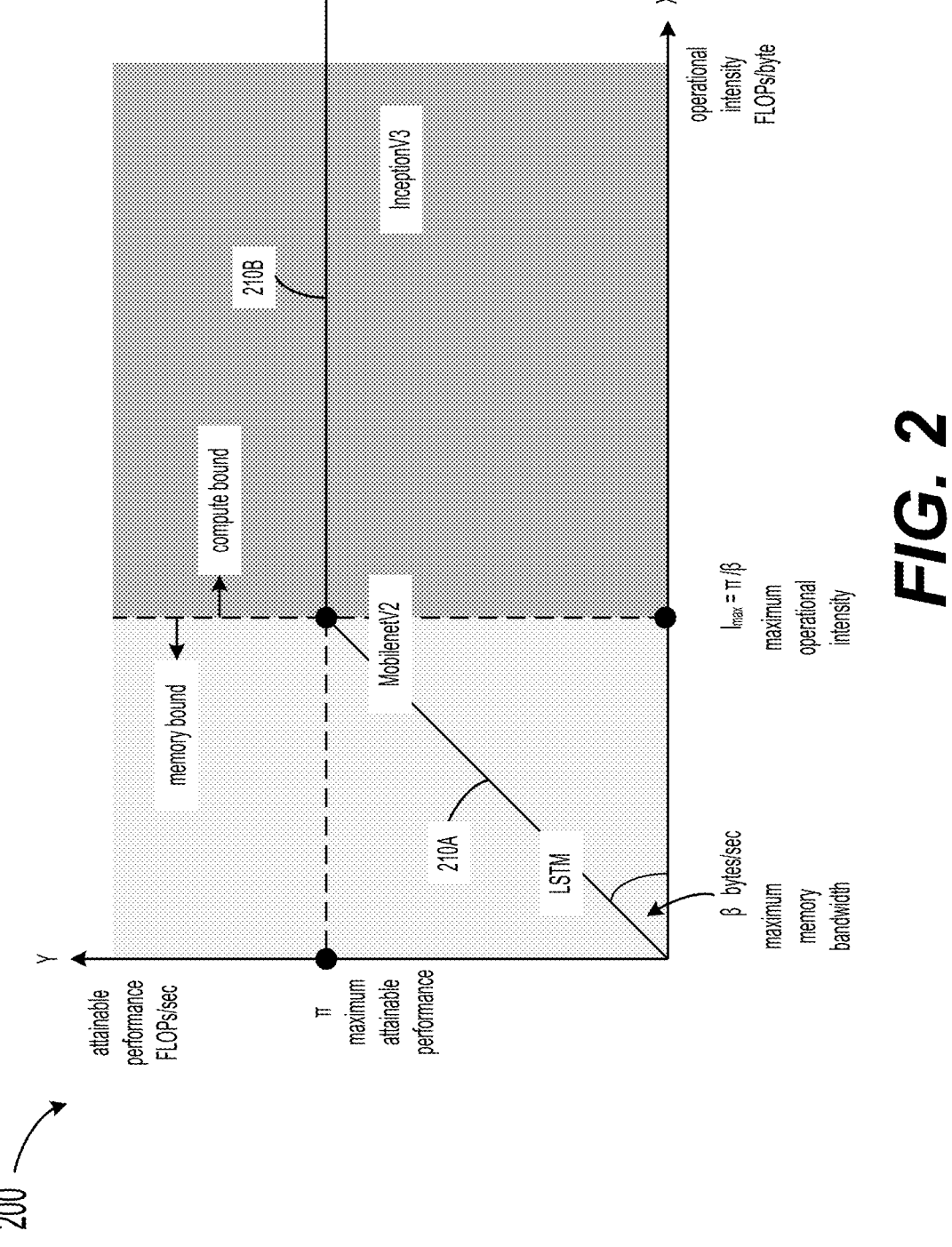
FIG. 2 shows a roofline model that is used to estimate a given compute kernel or application running on a multi-engine or accelerator processor architecture.

FIG. 2 shows a roofline model 200 that is used to estimate a given compute kernel or application e.g., the DNN model 100, running on a multi-engine or accelerator processor architecture, e.g., the APU system 110. In the roofline model 200, X-axis represents an operational intensity, i.e., the number of operations that can be performed when one byte is accessed, which is in units of the number of operations performed per byte, and Y-axis represents attainable performance, i.e., the maximum performance that the APU system 110 can attain, which is in units of FLOPs per second. In the roofline model 200, a curve is shown that consists of two platform-specific performance ceilings: a memory bound ceiling 210A that is derived from the memory bandwidth and a compute bound ceiling 210B that is derived from the processor's peak performance. For example, if the DNN model 100 is compute bound, e.g., InceptionV3, which has a large operational intensity and needs a small amount of data (e.g., weights) when performing operations by reusing the data, all the CUs of the APU system 110 are activated in order to increase execution speed. As another example, if the DNN model 100 is memory bound, e.g., a long short-term memory (LSTM) neural network, which has a very small operations intensity and needs a great amount of data (e.g., weights) when performing even a small number of operations, only a portion of the CUs that correspond to the bandwidth of the memory are activated in order to save power.

However, there may be diverse operations in the whole DNN model 100, i.e., some being computing bounded and the others being memory bounded. Therefore, activating a fixed number of the CUs for the whole DNN model 100 is not efficient. Aspects of the present disclosure thus introduces a fine-grained scheduling for the number of active CUs to increase overall system efficiency.

Figure 3:
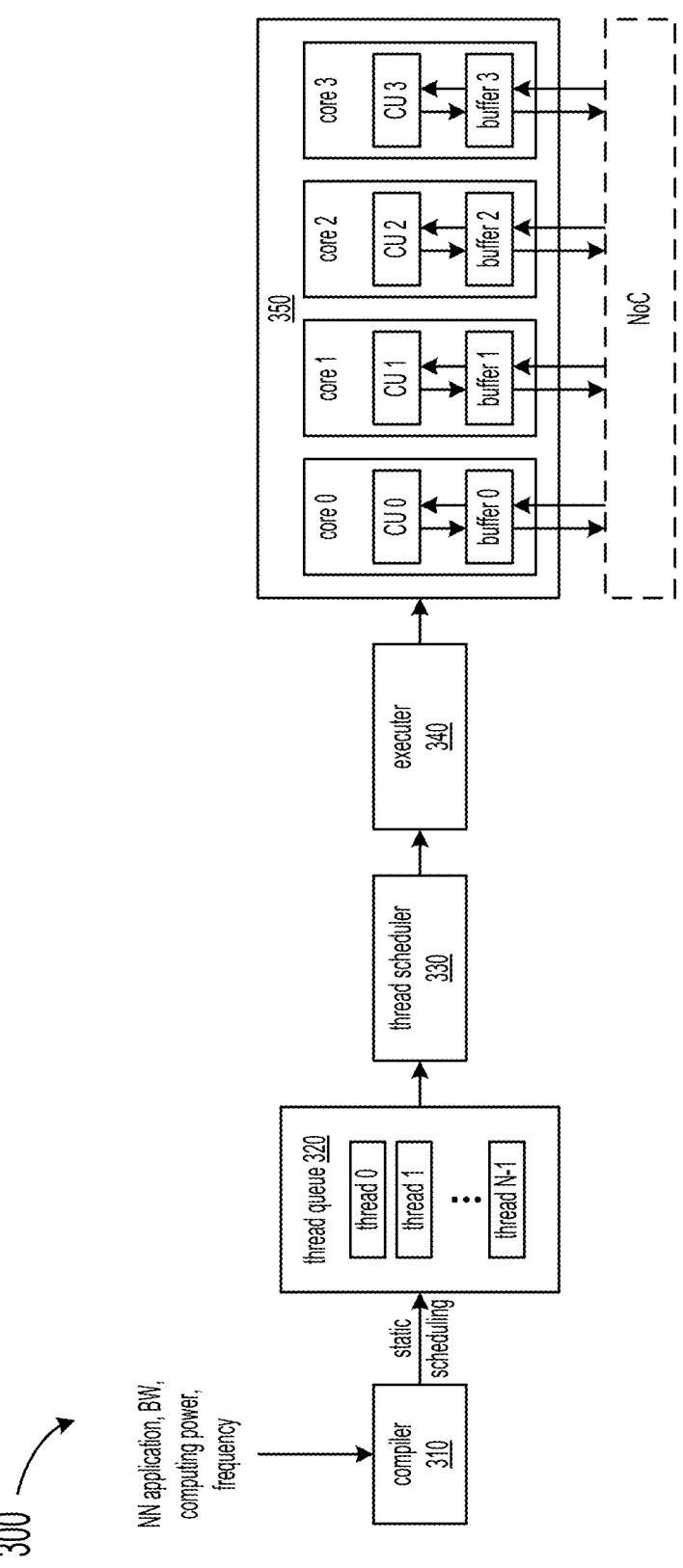
FIG. 3 is a functional block diagram of an exemplary multi-engine APU system (or apparatus) according to some embodiments of the present disclosure.

FIG. 3 is a functional block diagram of an exemplary multi-engine AI processing unit (APU) system (or apparatus) 300 according to some embodiments of the present disclosure. The APU system 300 can be implemented in a mobile device, such as a mobile phone. In the APU system 300, a plurality of computing units (CUs) can be scheduled statically (off-line) and be activated to execute operations/threads of a DNN model to save power and improve efficiency. In an embodiment, the APU system 300 can include a compiler 310 and a memory 320 coupled to the compiler 310. In an embodiment, the compiler 310 can compile a DNN model, e.g., the DNN model 100, to generate a plurality of operations/threads 0 to N-1, and store the operations/threads 0 to N-1 in the memory 320, e.g., a thread queue 320. In an embodiment, the compiler 310 can determine whether each of the operations/threads 0 to N-1 is compute bound or memory bound based on NN application, bandwidth (BW), computing power, frequency, etc. of the APU system 300. For example, for a thread the compute cycle can be calculated based on the number of MACs/(the number of active CUs×computing power per CU) and the memory read/write (R/W) cycle can be calculated based on the data IO size/BW×frequency, and the compiler 320 can determine that the thread is compute bound if its compute cycle is greater than its memory R/W cycle or is memory bound if its memory R/W cycle is greater than its compute cycle.

Figure 4:
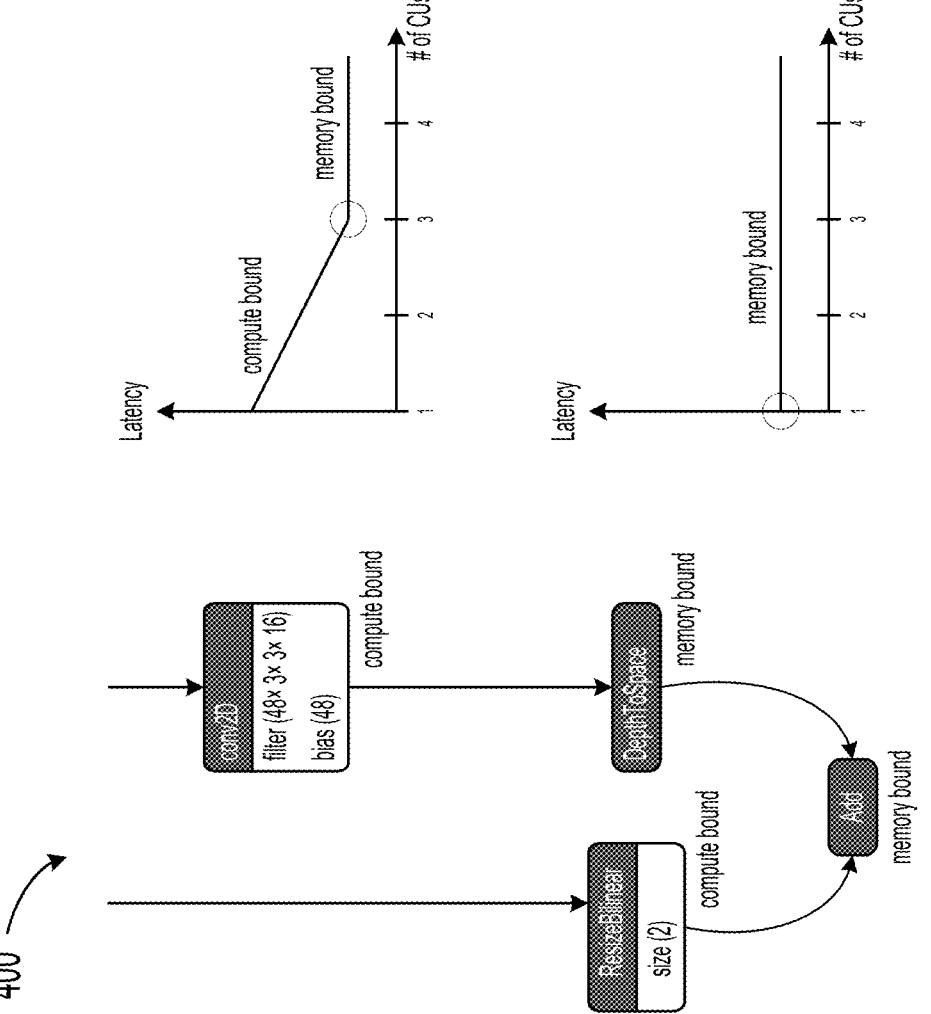
FIG. 4 shows operations/threads of an NN model generated by a compiler of the APU system.

For example, as shown in FIG. 4, the compiler 310 can analyze and compile a DNN model 400, e.g., the DNN model 100, layer by layer or subgraph by subgraph to generate a plurality of operations/threads, e.g., thread 0 that includes four operations: ResizeBilinear, Conv2D, Depth-ToSpace and Add, and determine that ResizeBilinear and Conv2D are compute bound as their latencies will decrease as the number of active CUs increases (e.g., ResizeBilinear corresponds to four (the maximum) active CUs and 10 units of execution time, and Conv2D corresponds to three active CUs and 5 units of execution time) and that DepthToSpace and Add are memory bound as their latencies will not change even if the number of active CUs increases (e.g., Depth-ToSpace corresponds to one CU and 20 units of execution time, and Add corresponds to two CUs and 15 units of execution time).

Refer to FIG. 3 again. In an embodiment, the APU system 300 can further include a thread scheduler (e.g., a processor)

330 that is coupled to the thread queue 320 and configured to schedule the threads 0 to N-1 stored in the thread queue 320 based on their priorities, for example. In an embodiment, the thread scheduler 330 can determine which thread stored in the thread queue 320 to run based on their priorities, for example, and CUs available in a multi-engine APU 350. In an embodiment, the APU system 300 can further include an executor (e.g., a processor) 340 that is coupled between the thread scheduler 330 and the multi-engine APU 350 and configured to allocate the scheduled threads 0 to N-1 to the multi-engine APU 350. In an embodiment, the multi-engine APU 350 can include a plurality of CUs 0 to M-1 each corresponding to a buffer 0 to M-1, where M is 4 in FIG. 3, for example. As having the knowledge as to whether an operation/thread is compute bound or memory bound, the executor 340 can allocate the threads 0 to N-1 and activate a portion of or all the CUs 0 to M-1 in order to save power or increase execution speed.

The thread scheduler 330 can have many different scheduling strategies. For example, the thread scheduler 330 can schedule the threads 0 to N-1 stored in the thread queue 320 by maximizing uRate (minimizing power) of the multi-engine APU 350 while meeting thread execution constraints (e.g., hard/soft constraints), where uRate is (the number of active CUs×execution time)/(the number of CUs of the APU 350×the total execution time), and hard/soft constraints for thread execution indicate whether a thread can be executed with fewer or more CUs than required.

Figures 5A, 5B, 5C:
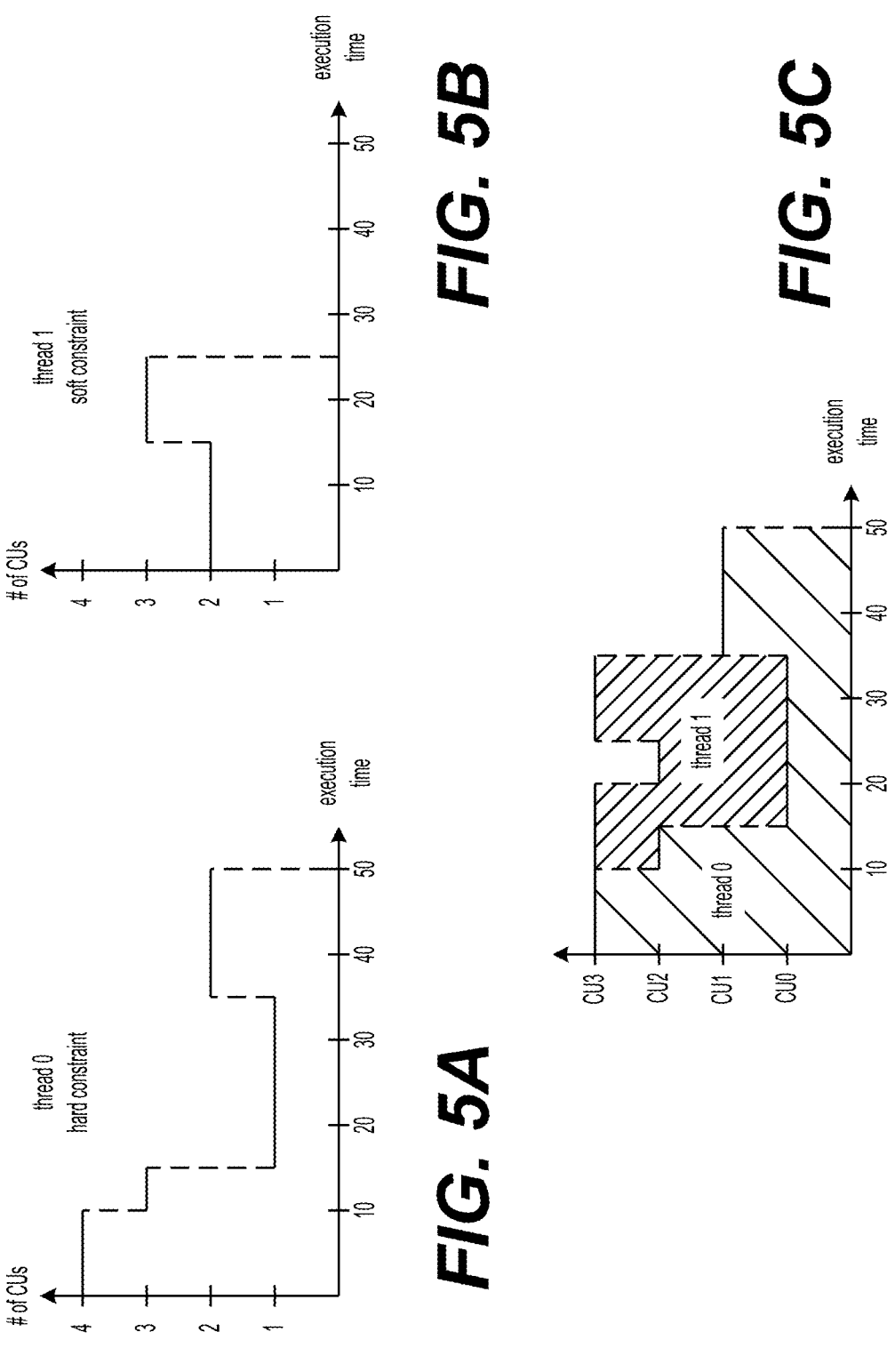
FIG. 5A shows a number of active compute units (CUs) of an APU of the APU system that are required for executing operations of a thread of the NN model and respective execution time thereof.
FIG. 5B shows a number of active CUs of the APU of the APU system that are required for executing operations of another thread of the NN model and respective execution time thereof.
FIG. 5C shows a number of active CUs of the APU of the APU system that are required for executing the operations of the thread and the another thread and respective execution time thereof.

As shown in FIG. 5A, for example, a thread 0 includes four operations, e.g., ResizeBilinear, Conv2D, DepthToSpace and Add, the number of active CUs required and the respective execution time of which are listed in FIG. 4, and is hard constraint for thread execution. As shown in FIG. 5B, a thread 1 includes first and second operations, the first operation requiring two active CUs to execute and corresponding to 15 units of execution time while the second operation requiring three active CUs to execute and corresponding to 10 units of execution time, and is soft constraint for thread execution. Accordingly, as shown in FIG. 5C, the thread scheduler 330 can schedule the CUs 0 to 3 of the APU 350 to execute the threads 0 and 1 as follows. From time 0 to 10, the thread scheduler 330 can schedule the CUs 0 to 3 to execute ResizeBilinear of the thread 0. From time 10 to 15, the thread scheduler 330 can schedule three of the CUs 0 to 3, e.g., the CUS 0 to 2, to execute Conv2D of the thread 0, and, in order to maximize the uRate, the thread scheduler 330 can further schedule the remaining of the CUs 0 to 3, i.e., the CU 3, to execute a first portion of the first operation of the thread 1 as the thread 1 is soft constraint and even only one CU, fewer than two CUs required, can still be scheduled to execute the first portion of the first operation of the thread 1. From time 15 to 20, the thread scheduler 330 can schedule one of the CUS 0 to 3, e.g., the CU 0, to execute a first portion of DepthToSpace of the thread 0, and, in order to maximize the uRate, the thread scheduler 330 can further schedule the remaining of the CUs 0 to 3, i.e., the CUS 1 to 3, to execute a second portion of the first operation of the thread 1 as the thread 1 is soft constraint and three CUs, more than two CUs required, can be scheduled to execute the second portion of the first operation. From time 20 to 25, the thread scheduler 330 can still schedule the CU 0 to execute a second portion of DepthToSpace of the thread 0, and, in order to maximize the uRate, the thread scheduler 330 can further schedule two of the remaining of the CUS 0 to 3, e.g., the CUs 1 and 2, to execute a third (last) portion of the first operation of the thread 1 as the third portion of the first operation requires only two CUs to execute. From time 25 to 35, the thread scheduler 330 can still schedule the CU 0 to execute a third (last) portion of DepthToSpace of the thread 0, and, in order to maximize the uRate, the thread scheduler 330 can further schedule the remaining of the CUS 0 to 3, i.e., the CUS 1 to 3, to execute the second operation of the thread 1. From time 35 to 50, the thread scheduler 330 can schedule two of the CUS 0 to 3, e.g., the CUS 0 and 1, to execute Add of the thread 0.

Figure 6:
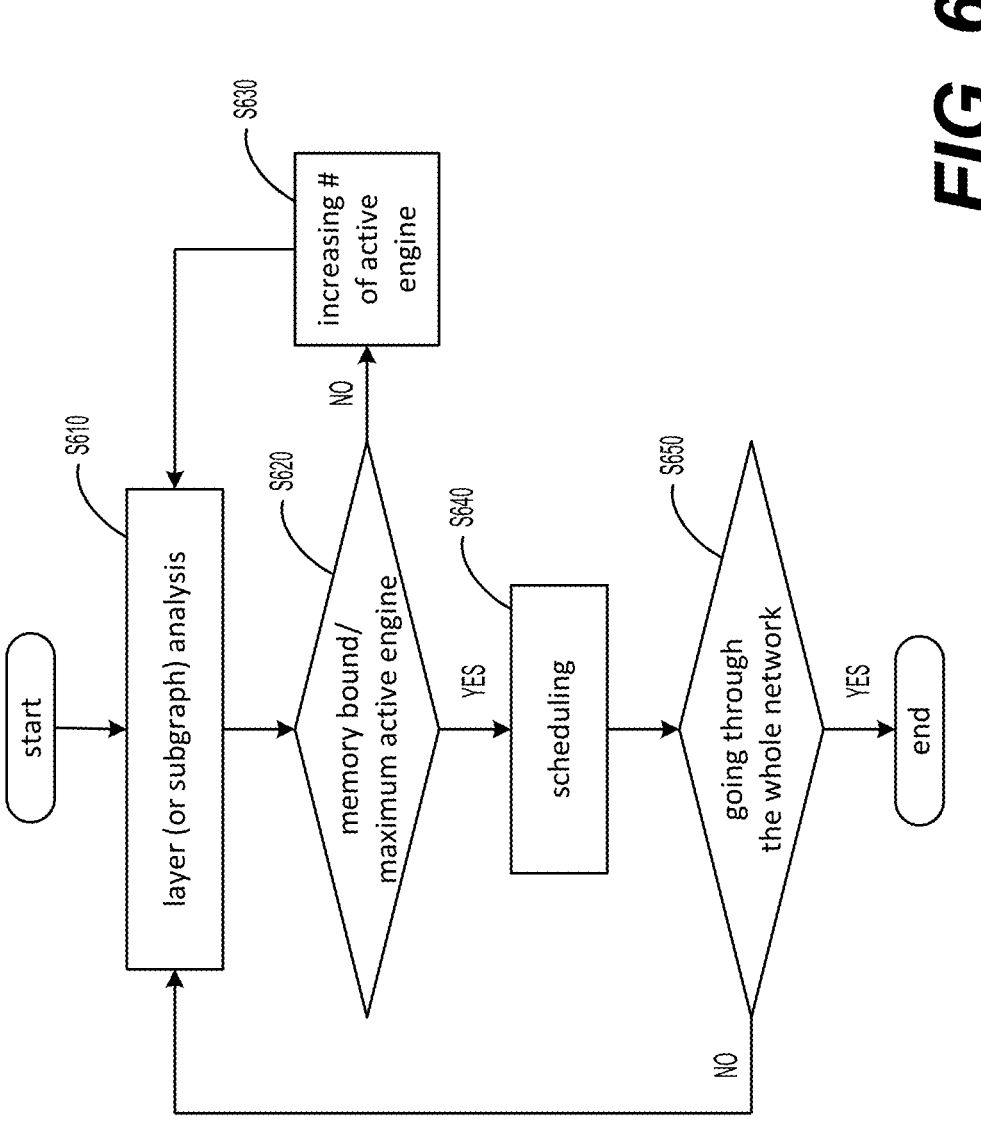
FIG. 6 is a flow chart of an exemplary statically scheduling method according to some embodiments of the present disclosure.
Figure 6:

FIG. 6 is a flow chart of an exemplary statically scheduling method 600 according to some embodiment of the present disclosure. The method 600 can be used to statically schedule operations/threads of a DNN model, e.g., the DNN model 100, that are executed by a multi-engine APU, e.g., the APU 350 or an APU 750 (shown in FIG. 7). In various embodiments, some of the steps of the method 600 shown can be performed concurrently or in a different order than shown, can be substituted by other method steps, or can be omitted. Additional method steps can also be performed as desired. Aspects of the method 600 can be implemented by an APU system, e.g., the APU system 300.

At step S610, the DNN model 100 is analyzed layer by layer or subgraph by subgraph to determine whether its operations/threads are compute bound or memory bound. For example, the compiler 310 of the APU system 300 can compile the DNN model 100 to generate a plurality of operations/threads.

At step S620, it is determined whether an operation/thread is memory bound or compute bound or whether a number of active engines scheduled is maximized if the operation/thread is compute bound. For example, the compiler 310 can determine whether each of the operations/threads is compute bound or memory bound based on NN application, bandwidth (BW), computing power, frequency, etc. of the APU system 300. The method 600 proceeds to step S630 if the number of the active engines scheduled is not maximized; otherwise, the method 600 proceeds to step S640.

At step S630, the number of active engines scheduled is increased. For example, the number of the active engines scheduled can be increased by one.

At step S640, the operations/threads are scheduled. For example, the thread scheduler 330 can schedule the operations/threads of the DNN model 100, which are either compute bound or memory bound, and the executor 640 can allocate the operations/threads and activate a portion of or all the CUs of the APU 350 or 750 in order to save power or increase execution speed.

At step S650, it is determined whether the analysis of the whole DNN model 100 is complete. The method 600 proceeds to step S610 if there is any layer or subgraph of the DNN model 100 that is not analyzed yet; otherwise, the method 600 ends.

Refer to FIG. 3 again. The multi-engine APU 350 includes a plurality of CUS, e.g., the CUs 0 to 3, each of which has its own dedicated buffer, e.g., buffers 0 to 3. Data to be executed by the CUS 0 to 3 are transferred from the NoC and stored in the buffers 0 to 3. In some scenarios, data to be executed by the different CUs 0 to 3 may be the same. For example, the CUS 0 and 1 may execute the same data, which, however, are repetitively stored in the buffers 0 and 1. Accordingly, more bandwidth of the NoC is occupied by the duplicative two of the data.

Figure 7:
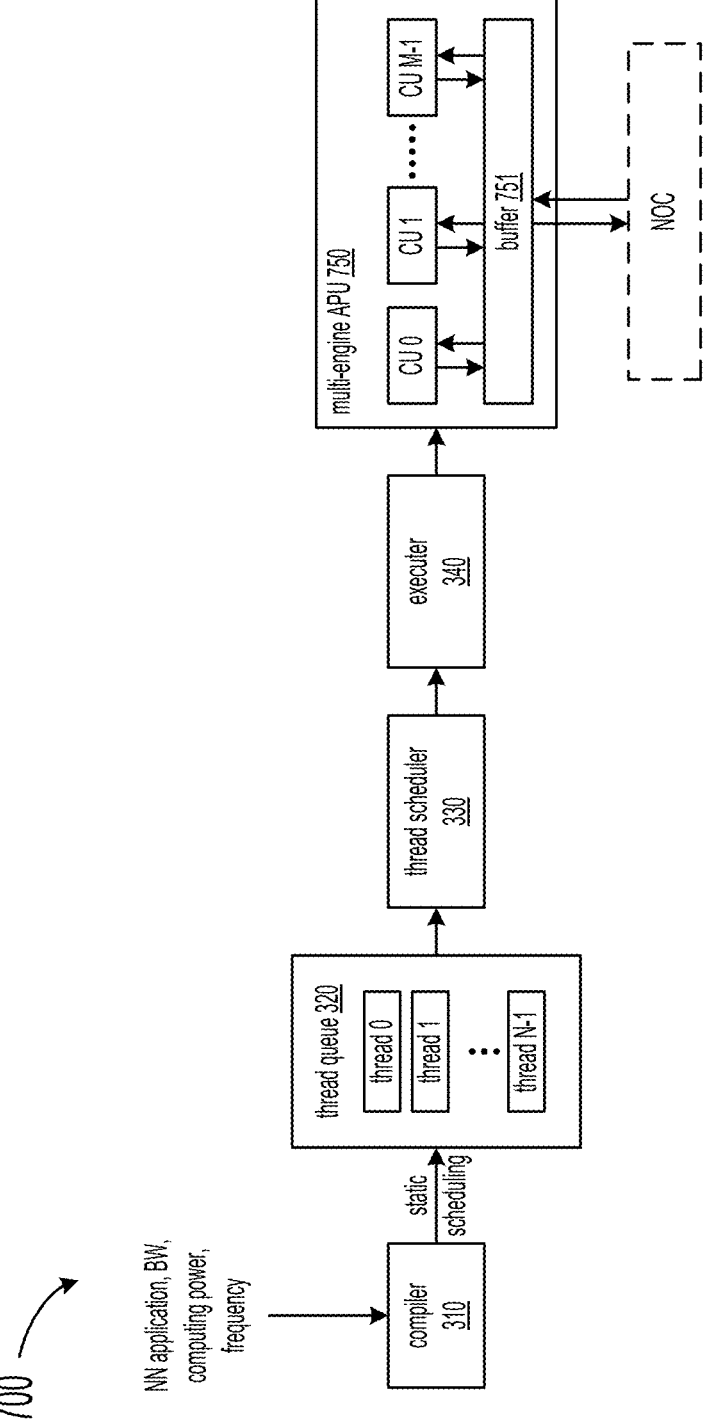
FIG. 7 is a functional block diagram of another exemplary multi-engine APU system (or apparatus) according to some embodiments of the present disclosure.

FIG. 7 is a functional block diagram of a multi-engine APU system (or apparatus) 700 according to some embodiments of the present disclosure. The APU system 700 can be implemented in a mobile device, such as a mobile phone. The APU system 700 differs from the APU system 300 in that an APU 750 replaces the APU 350 in the APU system 300. The APU 750 also includes a plurality of CUs, e.g., CU 0 to M-1 (M is 4, for example). Different from the APU 350, which includes a plurality of buffers each for a corresponding CU, the APU 750 includes a shared buffer 751, which is shared by at least two of the CUS 0 to 3, e.g., to all of the CUs 0 to 3. Therefore, the buffer 751 can be not greater than the buffers 0 to 3 in size, and, accordingly, less bandwidth of the NoC will be occupied by the data transferred to the buffer 751.

A whole system-on-chip (SoC) may have many other active components that will compete with the CUs of an APU for hardware resources and cannot be considered by a compiler off-line. In order to further improve the system efficiency, a dynamically (on-line) scheduling mechanism is also proposed according to the present disclosure.

Figure 8:
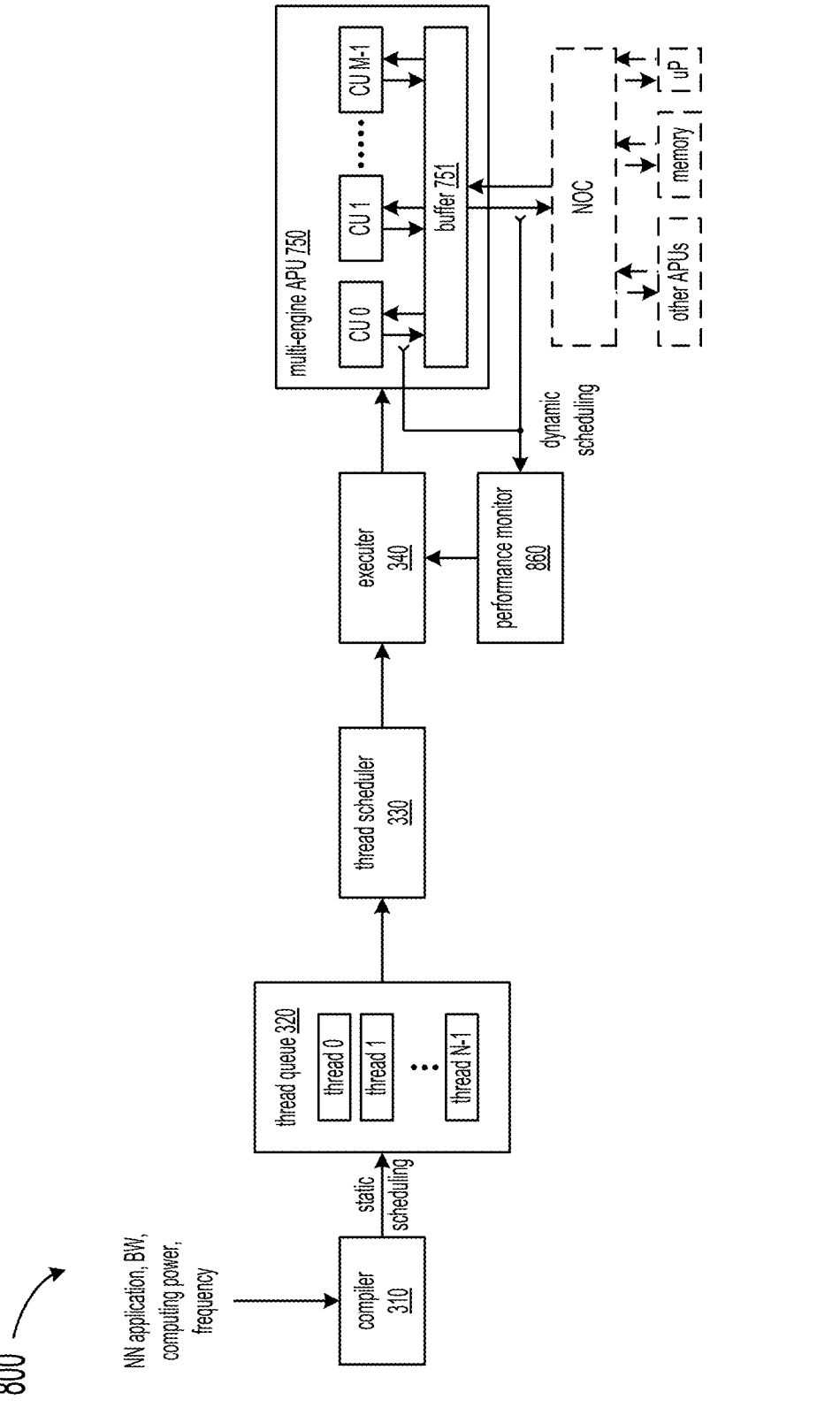
FIG. 8 is a functional block diagram of yet another exemplary multi-engine APU system (or apparatus) according to some embodiments of the present disclosure.

FIG. 8 is a functional block diagram of a multi-engine APU system (or apparatus) 800 according to some embodiments of the present disclosure. The APU system 800 can be implemented in a mobile device, such as a mobile phone. The APU system 800 differs from the APU system 700 in that the APU system 800 further includes a performance monitor (e.g., a processor) 860 that is coupled to the executor 340. In an embodiment, the performance monitor 860 can be configured to monitor the runtime performance of the APU 750 (e.g., the throughput of the CUs of the APU 750) and/or the runtime performance (or traffic) of the NoC (e.g., the I/O bandwidth between the buffer 751 and the NoC), and, accordingly, the executor 340 can schedule the threads/operations of the DNN model 100 dynamically (off-line) based on the runtime performance of the APU 750 and/or the runtime performance of the NoC.

Figure 9B:
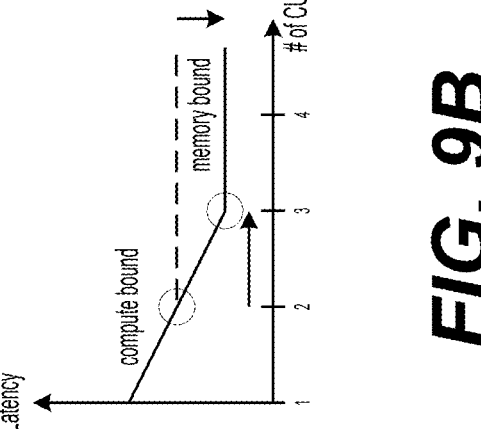
FIG. 9B shows a number of the CUs of the APU that are scheduled to be activated is increased due to increase of the runtime performance of the APU and/or the runtime performance of the network.
Figure 9A:
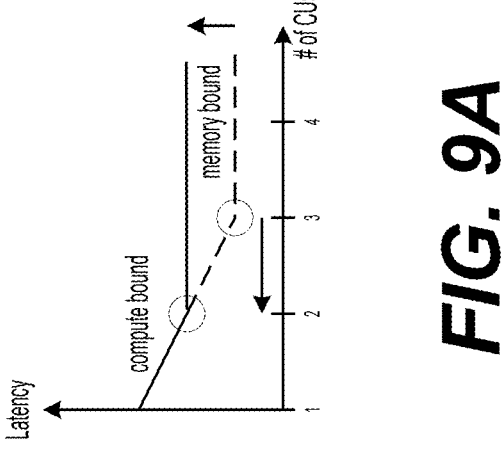
FIG. 9A shows a number of the CUs of the APU that are scheduled to be activated is decreased due to decrease of runtime performance of the APU and/or runtime performance of a network coupled to the APU.

For example, when the performance monitor 860 monitors that more I/O bandwidth between the buffer 751 and the NoC is occupied, e.g., by other APUs, memory, etc., and thus the monitored runtime performance of the APU 750 is worse than expected (e.g., some of the CUs that are scheduled to be activated are stalled accordingly), the executor 340 can deactivate some of the active CUs, which are scheduled to execute the current operations/threads of the DNN model 100, in order to save power and improve the system efficiency. In an embodiment, the executor 340 can deactivate the active CUs one at a time (e.g., from three to two), until the performance monitor 860 monitoring that none of the CUs that are activated previously is stalled, as shown in FIG. 9A. Compared to the individual buffers 0 to 3 of the APU 350, the shared buffer 751 of the APU 750 can allow the workloads of the currently deactivated CUs that are activated previously to be more easily distributed to other active CUs. As another example, when the performance monitor 860 monitors that less I/O bandwidth between the buffer 751 and the NoC is occupied, e.g., by other APUs that are idle from the time being, etc., and thus the monitored runtime performance of the APU 750 is not worse than expected (e.g., all of the CUs that are scheduled to be activated are functioning as expected), the executor 340 can activate more CUs, which, together with the currently active CUs, can be used to execute the current operations/threads of the DNN model 100, in order to improve the system efficiency. In an embodiment, the executor 340 can activate the CUs that are not activated yet one at a time (e.g., from two to three), until the performance monitor 860 monitoring that the throughput of the CUs cannot be increased any more, as shown in FIG. 9B. Compared to the individual buffers 0 to 3 of the APU 350, the shared buffer 751 of the APU 750 can allow the workloads of the previously activated CUs to be easily reallocated to the newly activated CUs.

In the exemplary embodiment of FIG. 8, the APU system 800 employs the statically scheduling mechanism and the dynamically scheduling mechanism and includes the APU 750, which includes the shared buffer 751. In another embodiment, the APU 750 in the APU system 800 can be replaced with the APU 350, which includes the individual buffers 0 to 3, and the performance monitor 860 can be configured to monitor the runtime performance of the APU 350 (e.g., the throughput of the CUs of the APU 350). In some embodiments, an APU system according to the present disclosure can employ the dynamically scheduling mechanism only.

Figure 10:
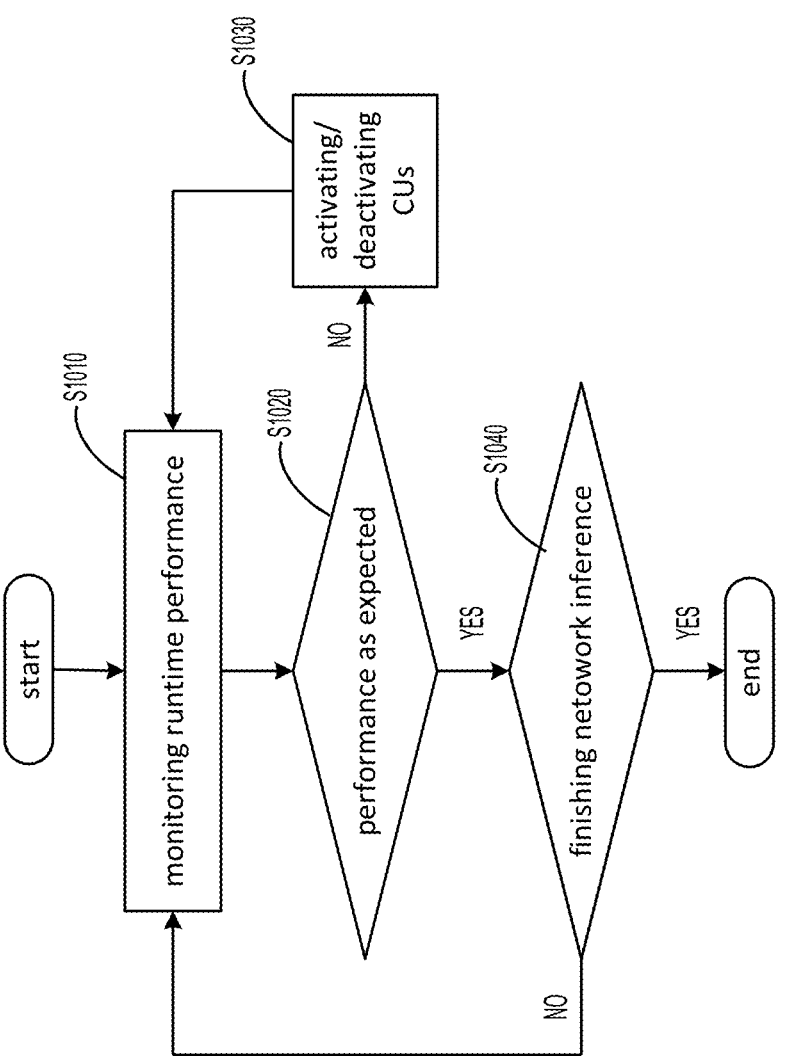
FIG. 10 is a flow chart of an exemplary dynamically scheduling method according to some embodiments of the present disclosure.
Figure 10:

FIG. 10 is a flow chart of an exemplary dynamically scheduling method 1000 according to some embodiment of the present disclosure. The method 1000 can be used to dynamically schedule operations/threads of a DNN model, e.g., the DNN model 100, that are executed by a multi-engine APU, e.g., the APUs 350 and 750. In various embodiments, some of the steps of the method 1000 shown can be performed concurrently or in a different order than shown, can be substituted by other method steps, or can be omitted. Additional method steps can also be performed as desired. Aspects of the method 1000 can be implemented by an APU system, e.g., the APU system 800.

At step S1010, the runtime performance of the APU system 800 is monitored. For example, the performance monitor 860 can monitor the runtime performance of the APU 750 (e.g., the throughput of the CUs of the APU 750) and the runtime performance (or traffic) of the NoC (e.g., the I/O bandwidth between the buffer 751 and the NoC).

At step S1020, whether the APU system 800 is performed as expected with regard to the current operations/threads of the DNN model 100 is determined. For example, it is determined that the APU system 800 is not performed as expected when the performance monitor 860 monitors that more I/O bandwidth between the buffer 751 and the NoC is occupied, e.g., by other APUs, memory, etc., and thus the monitored performance of the APU 750 is worse than expected (e.g., some of the CUs that are scheduled to be activated are stalled accordingly), or when the performance monitor 860 monitors that less I/O bandwidth between the buffer 751 and the NoC is occupied, e.g., by other APUs that are idle from the time being, etc., and thus the monitored performance of the APU 750 is not worse than expected (e.g., all of the CUs that are scheduled to be activated are functioning as expected). The method 1000 proceeds to step S1030 if it is determined in step S1020 that the APU system 800 is not performed as expected; otherwise, the method 1000 proceeds to step S1040.

At step S1030, more CUs are activated or some of the CUs that are scheduled to be activated are deactivated, based on the result of step S1020. For example, when the performance monitor 860 monitors that more I/O bandwidth between the buffer 751 and the NoC is occupied, e.g., by other APUs, memory, etc., and thus the monitored performance of the APU 750 is worse than expected (e.g., some of the CUs that are scheduled to be activated are stalled accordingly), the executor 340 can deactivate some of the active CUs (e.g., one at a time), which are scheduled to execute the current operations/threads of the DNN model 100, in order to save power and improve the system efficiency. As another example, when the performance monitor 860 monitors that less I/O bandwidth between the buffer 751 and the NoC is occupied, e.g., by other APUs that are idle from the time being, etc., and thus the monitored performance of the APU 750 is not worse than expected (e.g., all of the CUs that are scheduled to be activated are functioning as expected), the executor 340 can activate more CUs (e.g., one at a time), which, together with the currently active CUs, can be used to execute the current operations/threads of the DNN model 100, in order to improve the system efficiency and increase the execution speed. The method 1000 keeps on monitoring the runtime performance of the APU system 800 with regard to the current operations/threads of the DNN model 100 and activating more CUs or deactivating some of the CUs that are scheduled to be activated until the APU system 800 is performed as expected.

At step S1040, whether the whole network inference is finished is determined. The method 1000 ends if the whole network inference of the DNN model 100 is finished; otherwise, the method 1000 proceeds to step S1010 for next operations/threads of the DNN model 100.

Figure 11:
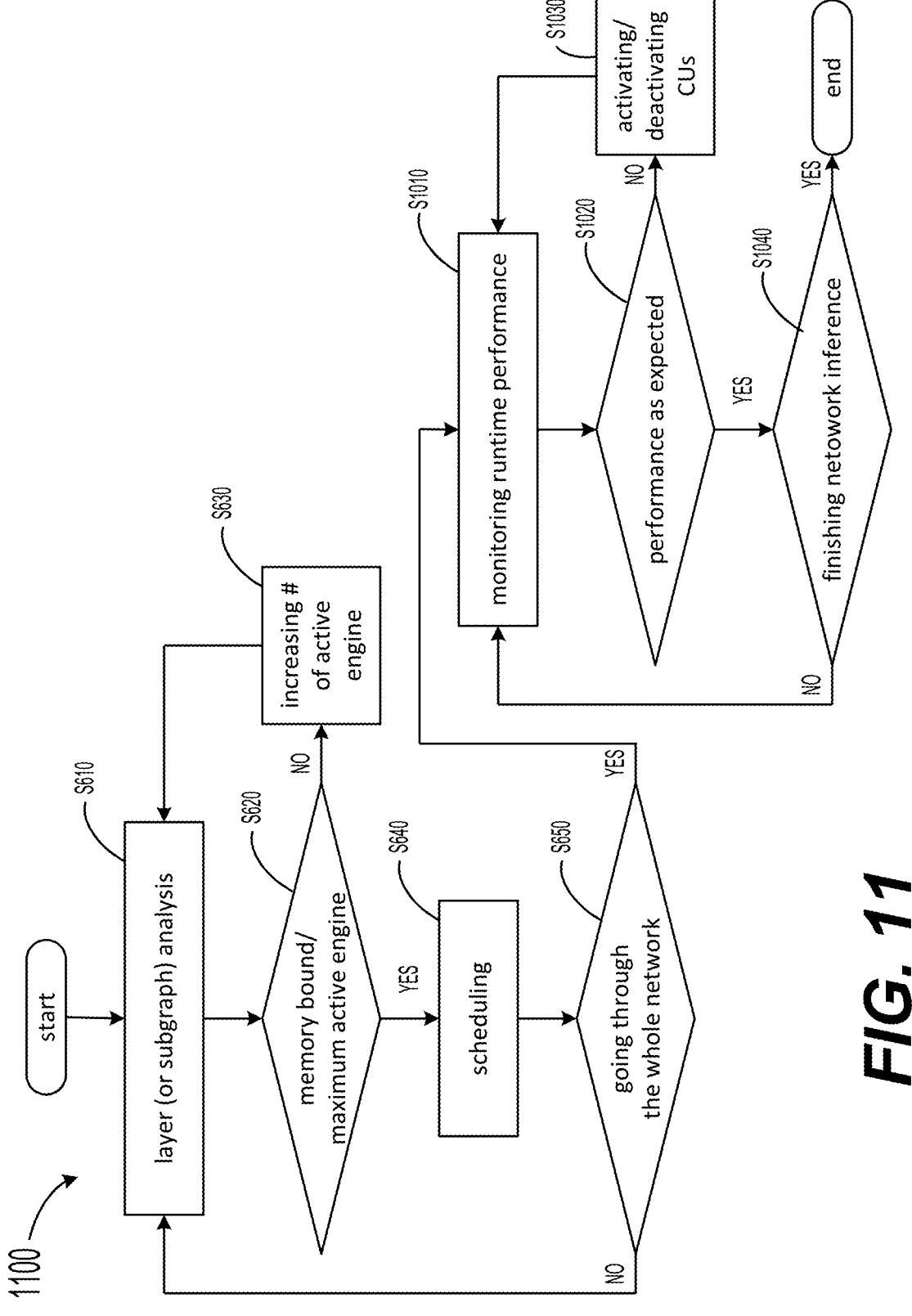
FIG. 11 is a flow chart of an exemplary statically and dynamically scheduling method according to some embodiment of the present disclosure.

FIG. 11 is a flow chart of an exemplary statically and dynamically scheduling method 1100 according to some embodiment of the present disclosure. The method 1100 can be used to statically (off-line) and dynamically (on-line) schedule operations/threads of a DNN model, e.g., the DNN model 100, that are executed by a multi-engine APU, e.g., the APUs 350 and 750. In various embodiments, some of the steps of the method 1100 shown can be performed concurrently or in a different order than shown, can be substituted by other method steps, or can be omitted. Additional method steps can also be performed as desired. The method 1100 can combine the methods 600 and 1000 and be implemented by an APU system, e.g., the APU system 800. For example, the compiler 310 can compile the DNN model 100 to generate a plurality of operations/threads (at step S610), determine whether each of the operations/threads is compute bound or memory bound based on NN application, bandwidth (BW), computing power, frequency, etc. of the APU system 800 (at step S620), and increase the number of active engines if the number of the active engines scheduled is not maximized (at step S630), the thread scheduler 330 can schedule the operations/threads (at step S640), and the executor 340 can allocate the operations/threads and activate a portion of or all the CUs of the APU 350 or 750 in order to save power or increase execution speed. As another example, after the analysis of the whole DNN model 100 is complete (at step S650), the performance monitor 860 can monitor the runtime performance of the APU 750 (e.g., the throughput of the CUs of the APU 750) and the runtime performance (or traffic) of the NoC (e.g., the I/O bandwidth between the buffer 751 and the NoC) (at step S1010), and determine whether the APU system 800 is performed as expected with regard to the current operations/threads of the DNN model 100 (at step S1020), and the executor 340 can activate more CUs or deactivate some of the CUs that are scheduled to be activated based on the result of step S1020 (at step S1030), until the whole network inference is finished.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for optimizing resource allocation in a multi-engine artificial intelligence (AI) processing unit, comprising:

a compiler configured to compile a neural network (NN) model to generate a plurality of operations assigned to threads for execution, and determine whether each of the operations and threads is compute bound or memory bound;

a memory coupled to the compiler, the memory configured to store the operations and threads of the NN model;

a thread scheduler coupled to the memory, the thread scheduler configured to schedule the operations and threads of the NN model;

a multi-engine AI processing unit that includes a plurality of physical compute units (CUs); and an executor coupled between the thread scheduler and the multi-engine AI processing unit, the executor configured to allocate the operations and threads of the NN model and activate a number of the physical CUs of the multi-engine AI processing unit for each of the operations and threads, based on runtime performance of the multi-engine AI processing unit, and based on whether the operation and/or thread is compute bound or memory bound.

2. The apparatus of claim 1, further comprising:

a performance monitor coupled to the executor, the performance monitor configured to monitor runtime performance of the multi-engine processing unit and/or runtime performance of a network coupled to the multi-engine processing unit, wherein the executor is further configured to change the number of the CUs that are activated based on the runtime performance of the multi-engine processing unit and/or the runtime performance of the network.

3. The apparatus of claim 2, wherein the executor is configured to change the number of the physical CUs that are activated by activating one of the physical CUs that are not activated or deactivating one of the physical CUs that are activated at a time.

4. The apparatus of claim 2, wherein the runtime performance of the multi-engine processing unit includes throughput of the physical CUs.

5. The apparatus of claim 2, wherein the runtime performance of the network includes input/output bandwidth between the network and the multi-engine processing unit.

6. The apparatus of claim 1, wherein the multi-engine processing unit further includes a buffer that is coupled to and shared by at least two of the physical CUs.

7. The apparatus of claim 1, wherein the thread scheduler is configured to schedule the operation and threads by maximizing uRate of the multi-engine processing unit while meeting thread execution constraints.

8. The apparatus of claim 1, wherein the compiler determines that one of the operations and threads is the compute bound if a compute cycle of the operation or thread is greater than a memory read/write (R/W) cycle of the operation or thread, or is the memory bound if the compute cycle is not greater than the memory R/W cycle.

9. The apparatus of claim 1, wherein the memory includes a queue.

10. An apparatus for optimizing resource allocation in a multi-engine artificial intelligence (AI) processing unit, comprising:

a compiler configured to compile a neural network (NN) model to generate a plurality of operations assigned to threads for execution;

a memory coupled to the compiler, the memory configured to store the operations and threads of the NN model;

a thread scheduler coupled to the memory, the thread scheduler configured to schedule the operations and threads of the NN model;

a multi-engine AI processing unit that includes a plurality of physical compute units (CUs);

a performance monitor configured to monitor runtime performance of the multi-engine AI processing unit and/or runtime performance of a network coupled to the multi-engine AI processing unit; and an executor coupled between the thread scheduler and the multi-engine AI processing unit, and the performance monitor, the executor configured to allocate the operations and threads of the NN model, activate a number of the physical CUs of the multi-engine AI processing unit for each of the operations and threads, and change the number of physical CUs that are activated based on the runtime performance of the multi-engine AI processing unit and/or the runtime performance of the network, and based on whether the operation and/or thread is determined to be compute bound or memory bound.

11. The apparatus of claim 10, wherein the executor is configured to change the number of the physical CUs that are activated by activating one of the physical CUs that are not activated or deactivating one of the physical CUs that are activated at a time.

12. The apparatus of claim 10, wherein the runtime performance of the multi-engine processing unit includes throughput of the physical CUs.

13. The apparatus of claim 10, wherein the runtime performance of the network includes input/output bandwidth between the network and the multi-engine processing unit.

14. The apparatus of claim 10, wherein the compiler is further configured to determine whether each of the operations and threads is compute bound or memory bound, and the executor is configured to activate the number of the physical CUs of the multi-engine processing unit for each of the operations and threads based on whether the operation or thread is compute bound or memory bound.

15. The apparatus of claim 10, wherein the multi-engine processing unit further includes a buffer that is coupled to and shared by at least two of the physical CUs.

16. The apparatus of claim 10, wherein the thread scheduler is configured to schedule the operation/threads by maximizing uRate of the multi-engine processing unit while meeting thread execution constraints.

17. The apparatus of claim 10, wherein the compiler determines that one of the operations and threads is the compute bound if a compute cycle of the operation or thread is greater than a memory read/write (R/W) cycle of the operation or thread, or is the memory bound if the compute cycle is not greater than the memory R/W cycle.

18. The apparatus of claim 10, wherein the memory includes a queue.

* * * * *